United States Patent [19]
Roberts et al.

[11] Patent Number: 4,850,041
[45] Date of Patent: Jul. 18, 1989

[54] LASER RADAR WITH ADJUSTABLE LOCAL OSCILLATOR

[75] Inventors: Dudley A. Roberts, Costa Mesa; John S. Chudy, Long Beach, both of Calif.

[73] Assignee: Ford Aerospace & Communications Corporation, Newport Beach, Calif.

[21] Appl. No.: 49,889

[22] Filed: May 13, 1987

[51] Int. Cl.<sup>4</sup> .......................... H04B 9/00; G01P 3/36
[52] U.S. Cl. .................................... 455/604; 455/609; 455/616; 356/5; 356/28
[58] Field of Search ............... 455/604, 606, 609, 616, 455/600; 329/144; 356/3, 4, 27, 28, 5, 28.5; 320/1, 2; 342/188, 167

[56] References Cited

U.S. PATENT DOCUMENTS

| | | | |
|---|---|---|---|
| 3,215,840 | 11/1965 | Buhrer | 250/199 |
| 3,409,369 | 11/1968 | Bickel | 455/604 |
| 3,435,229 | 3/1966 | Buhrer | 250/199 |
| 3,503,682 | 3/1970 | Botcherby | 356/4 |
| 3,532,890 | 9/1967 | Denton | 250/199 |
| 3,584,221 | 6/1971 | Furukawa | 250/199 |
| 3,638,024 | 1/1972 | Chen et al. | 250/199 |
| 3,676,003 | 7/1972 | Naiman et al. | 455/604 |
| 3,694,656 | 9/1972 | Henning | 250/199 |
| 3,975,628 | 8/1976 | Graves et al. | 250/199 |
| 4,011,445 | 3/1977 | O'Meara | 250/199 |
| 4,063,084 | 12/1977 | Goodwin et al. | 250/199 |
| 4,131,792 | 12/1978 | Schlossberg | 250/199 |
| 4,184,767 | 1/1980 | Hughes et al. | 356/327 |
| 4,209,253 | 6/1980 | Hughes | 356/4 |
| 4,270,862 | 6/1981 | Hewitt | 356/28 |
| 4,299,484 | 11/1981 | Holzapfel | 356/5 |
| 4,413,905 | 11/1983 | Holzapfel | 356/28 |
| 4,439,014 | 3/1984 | Stacy et al. | 350/388 |
| 4,506,388 | 3/1985 | Monerie et al. | 455/616 |
| 4,530,600 | 7/1985 | Lopez | 356/5 |
| 4,596,052 | 6/1986 | Wright et al. | 455/619 |
| 4,643,575 | 2/1987 | Hazeltine et al. | 356/28.5 |

Primary Examiner—Robert L. Griffin
Assistant Examiner—Andrew J. Telesz, Jr.
Attorney, Agent, or Firm—Edward J. Radlo; Harry G. Weissenberger; Keith L. Zerschling

[57] ABSTRACT

The relative intensity of the transmit beam and the local oscillator beam in a ladar diplexer can be continuously adjusted during operation by using a rotatable retardation plate with a slightly inclined "C" axis to turn a polarized laser beam into a composite beam having two components polarized in mutually perpendicular directions. The relative intensity of the components is adjustable by varying the inclination of the "C" axis. The composite beam is applied to the same polarizer element normally used to separate the return signal from the transmit beam. The polarizer acts as the beam splitter which separates the local oscillator beam from the transmit beam. The described configuration also saves one beam splitter and allows improved packaging and alignment of the diplexer.

6 Claims, 2 Drawing Sheets

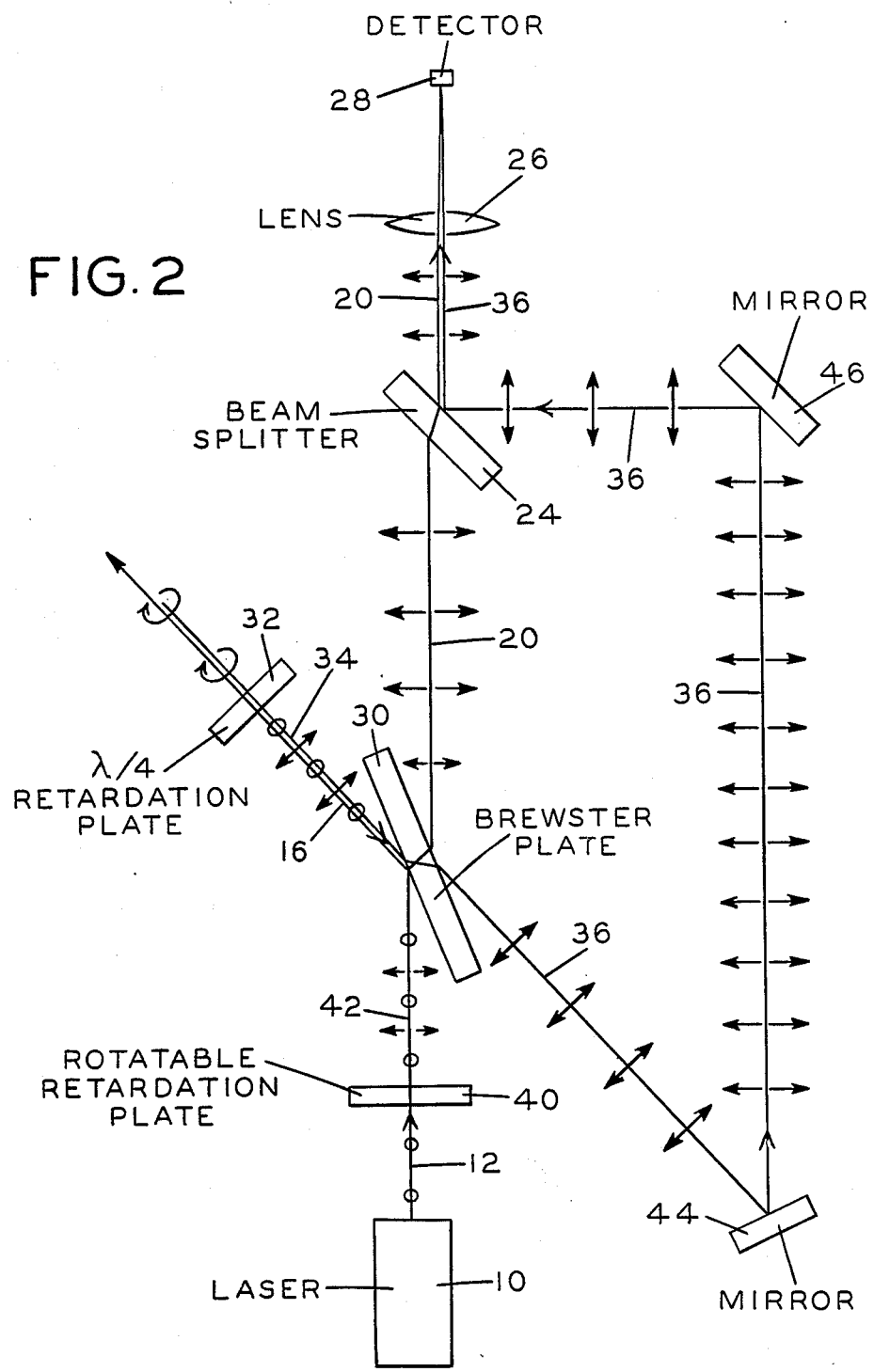

LASER RADAR WITH ADJUSTABLE LOCAL OSCILLATOR

FIELD OF THE INVENTION

This invention relates to laser radar, and more particularly to a diplexer arrangement which allows the relative proportions of reflected signal and local oscillator signal to be adjusted during operation.

BACKGROUND OF THE INVENTION

Homodyne laser radar (ladar) velocimeters, such as ground speed indicators for aircraft, detect the relative speed between a laser and a reflective target by exposing a photodiode simultaneously to a portion of the laser's light and to the return signal produced by the reflection of the laser's light from the target. Relative motion of the target with respect to the laser (or vice versa) produces a Doppler shift in the frequency of the reflected beam. the photodiode sees this shift as a light intensity variation at a beat frequency proportional to the speed of the relative motion. The resulting signal at the output of the photodiode circuit is the speed signal.

In order to prevent saturation of the photodiode by one of the two component signals it detects, the amplitude relationship between the local oscillator (LO) signal produced by the laser and the return signal reflected by the target must be carefully controlled. Also, the small diameter of the laser beam requires a very precise alignment of the optical components of the system; and, as in any airborne equipment, size and weight are important practical considerations.

In the prior art, it has been conventional to derive the LO signal from the transmitted laser beam through the use of a beam splitter which reflected a fixed percentage of the impinging laser beam and transmitted the rest. Consequently, in order to change the intensity ratio between the LO signal and the return signal at the detector, it was necessary to change the beam splitter and realign the system—something which could only be done at a maintenance facility.

Prior art systems relied, as does the inventive system, on the use of a polarization-sensitive optical element such as a Brewster plate to separate the transmit laser beam from the return signal beam. For this reason, the laser beam is usually linearly polarized. In the prior art, the polarization of the LO signal had to be shifted by 90 degrees after the LO signal was split off from the transmitted beam in order to match the polarization of the target signal at the detector. This required a half-wave retardation plate to be placed in the path of the LO signal at a location which caused the optical layout of the system to have a substantial width and length.

The prior art includes the following U.S. Pats. Nos.: Buhrer 3,215,840 and 3,435,229 using separate detectors for the LO and target signals; Dento 3,532,890 and Furukawa 3,584,221 relating to an optical pulse code modulated multiplexer; Chen 3,638,024 relating to pulse interval modulation of a laser beam by controlling polarization; Henning 3,694,656 dealing with a demodulation system; Graves et al 3,975,628 relating to a laser receiver immune to Doppler shifts and noise; O'Meara 4,011,445 dealing with a dual-receiver laser radar imaging system; Goodwin et al relating to a PCM communications receiver using quadrature demodulation of laser signals; Schlossberg 4,131,792 relating to a resonant diplexer; Stacy et al 4,439,014 relating to an electro-optic modulator; and Monerie et al 4,056,388 relating to a two-detector orthogonal demodulator. Overall, the cited prior art is mostly concerned with methods of mixing signals polarized in opposite directions.

SUMMARY OF THE INVENTION

The present invention allows adjustment of the LO-to-return signal ratio during operation, while reducing the size and weight of the transceiver optics and improving its ease of alignment, by using the Brewster plate to separate not only the return signal from the transmit beam, but also the LO beam from the transmit beam. This allows the intensity of the LO beam to be adjusted simply by rotating a rotatably mounted retardation plate (usually, but not necessarily, quarter-wave) interposed in the path of the transmitted beam immediately in front of the laser.

The elimination of the LO beam splitter and of the half-wave retardation plate positioned laterally of the transmitted beam makes it possible to produce a very narrow and consequently short optical system in which the alignable components are more conveniently accessible.

BRIEF DESCRIPTION OF THE DRAWINGS

FIG. 2 is a schematic view of a homodyne ladar diplexer constructed in accordance with this invention.

DESCRIPTION OF THE PREFERRED EMBODIMENT

Figure 1:
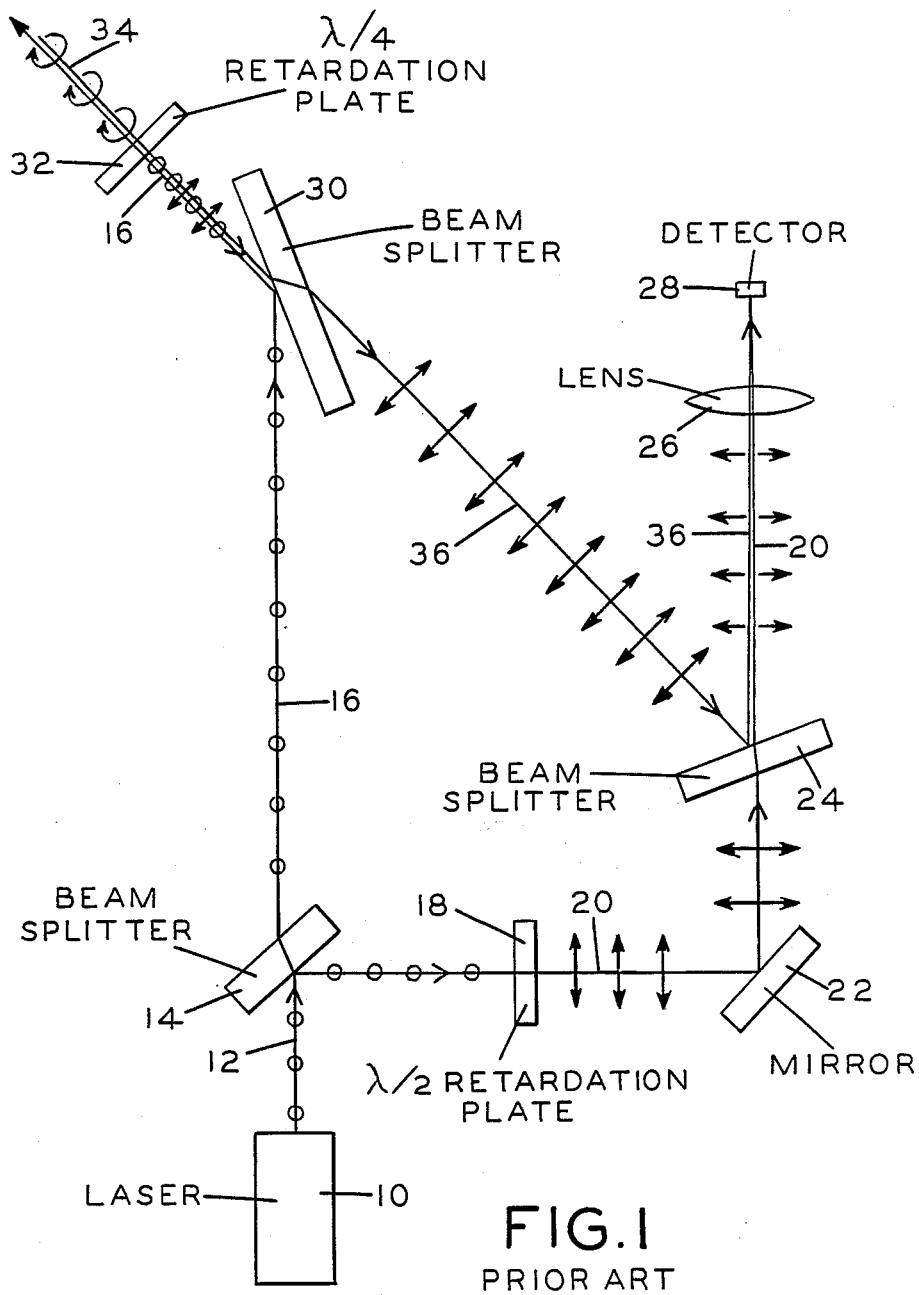
FIG. 1 is a schematic view of a prior art homodyne ladar diplexer.

FIG. 1 shows a conventional homodyne ladar diplexer. A laser transmitter 10 emits a vertically polarized beam 12. In accordance with conventional notations, the vertical polarization of the beam 12 is indicated by small circles in the drawings. "Vertical", as used in connection with the drawings in this case, means perpendicular to the plane of the paper, while "horizontal" means in the plane of the paper.

The beam 12 impinges upon the LO beam splitter 14, where a portion of beam 12 is refracted to form the vertically polarized transmit beam 16. The other portion of the beam 12 is passed through a half-wave ($\lambda/2$) retardation plate 18, whose "C" axis is at 45 degrees, to form the horizontally polarized LO beam 20. Horizontal polarization is conventionally indicated in the drawings by transverse arrows.

The LO beam 20 is turned 90 degrees by a mirror 22 and then passed through a reverse or mixing beam splitter 24. It is refracted by the beam splitter 24 and continues through the detector lens 26 to impinge upon the detector 28.

The transmit beam 16 impinges upon a polarizing element such as a Brewster's Angle beam splitter 30 which has the property of reflecting vertically polarized light but refracting horizontally polarized light. Inasmuch as the transmit beam 16 is vertically polarized, it is reflected toward the quarter-wave ($\lambda/4$) retardation plate 32 whose "C" axis is also at 45 degrees. The plate 32 imparts a rotating polarization to the beam 16 as it exits the diplexer toward the distant reflective target (not shown) whose speed of motion with respect to the diplexer assembly is to be measured.

The rotatingly polarized return signal beam 34 received from the target is again passed through the $\lambda/4$ retardation plate 32 to give it a more or less horizontal polarization. The horizontal polarization vector 36 of the return signal beam 34 passes through the Brewster plate 30 with some later translation but no change in direction. The return beam 36 is reflected by the mixing beam splitter 24 through the detector lens 26 onto the detector 28. If there is relative motion between the diplexer and the target, the return signal beam is frequency-shifted by the Doppler effect, and the interaction between the return beam 36 and the LO beam 20 produces an illumination of the detector 28 which varies at a beat of frequency indicative of the speed of that relative motion.

In order for the speed-indicating illumination beat to be clearly discernible, the intensity of the return beam 36 must be as close as possible to that of the LO beam 20. If the use of the diplexer results in a return signal 34 that is considerably stronger or weaker than the design of the diplexer anticipates, it is necessary to exchange the LO beam splitter 14 for another with a different mix percentage. Any such replacement, of course, usually requires realignment of the diplexer components to precisely focus the beams 36 and 20 onto the detector 28—a difficult and time-consuming job requiring a maintenance facility.

The inventive diplexer shown in FIG. 2 uses the Brewster plate (or other polarizing element) 30 as a local oscillator beam splitter, making the relative intensities of beams 36 and 20 continuously adjustable during operation while using only two beam splitter elements instead of three. This reduces cost, power losses and alignment problems, and makes the diplexer assembly more compact.

In FIG. 2, the vertically polarized laser is again shown at 10. This time, however, the vertically polarized beam 12 is applied not to a beam splitter, but to a rotatably mounted retardation plate 40 with its "C" axis nearly vertical. The small inclination of the "C" axis of plate 40 produces a beam 42 with a small horizontally polarized vector and a large vertically polarized vector. When the beam 42 impinges on the Brewster plate 30, the vertically polarized component of beam 42 is reflected to become the transmit beam 16. The horizontally polarized component of beam 42, on the other hand, is refracted by the Brewster plate 30 to form the LO beam 20.

In the same manner as described above in connection with FIG. 1, the Brewster plate 30 passes the horizontally polarized beam 36 of the return signal 34 with only a lateral displacement. Mirrors 44 and 46 reflect beam 36 onto the mixing beam splitter 24 which, as in FIG. 1, combines return beam 36 and LO beam 20 for focusing onto detector 28 by detector lens 26.

The relative intensities of LO beam 20 and transmit beam 16 (which in turn controls the intensity of beam 36) can be continuously adjusted during operation of the diplexer by simply rotating the retardation plate 40 to vary the relative proportions of the horizontally polarized and vertically polarized components of beam 42.

The inventive diplexer of FIG. 2 has several other advantages over the prior art diplexer of FIG. 1. Alignment is facilitated because of the provision of two mirrors 44, 46 and their relative position with respect to the other components. In systems of this type, alignment of the beams 36 and 20 is typically done by adjusting the angles of two mirrors in the path of one of these beams until that beam is parallel and adjacent to the other beam. In the diplexer of FIG. 1, one of those mirrors is also a beamsplitter (either 14 or 24). This affects both beams, and can also alter the efficiency of the beamsplitter.

By contrast, in the diplexer of FIG. 2, the two mirrors 44 and 46 have no other purpose than to fold the beam. The fact that they are not transmissive elements permits simple mountings and easy adjustment. In addition, both mirrors are on the outside edge of the diplexer, where they are easily accessible.

The narrow, elongated shape of the optical path of the diplexer of FIG. 2 is also advantageous from a packaging and servicing standpoint.

It will be understood that although the invention has been described herein in terms of a homodyne ladar, it is equally applicable to a heterodyne ladar by placing a conventional frequency shifter in either the path of LO beam 20 or in the path of beam 36.

It will also be understood that other variations are possible, including variations incorporating the two-detector orthogonal schemes described in such prior art as the above-mentioned Monerie et al. U.S. Pat. No. 4,056,388. Such variations would be equally applicable to the FIG. 1 and FIG. 2 diplexers described herein.

We claim:

1. A laser diplexer, comprising:
    (a) a laser for producing a laser beam polarized in a first direction:
    (b) a retardation plate interposed in the path of said laser beam, said plate being so oriented as to produce a beam having a transmit beam component polarized in said first direction and a local oscillator beam component polarized in a second direction perpendicular to said first direction:
    (c) a detector; and
    (d) a polarizer element interposed in the path of said transmit beam and said local oscillator beam so as to reflect said transmit beam toward a target, but refract said local oscillator beam toward said detector;
    (e) said polarizer element being also interposed in the path of the return signal from said target so as to refract the return signal beam polarized in said second direction, and
    (f) said diplexer further comprising optical means for orienting said return signal beam parallel and adjacent to said local oscillator beam toward said detector.

2. The diplexer of claim 1, in which said optical means include a pair of mirrors, each of said mirrors being pivotally movable about two mutually orthogonal axes.

3. The diplexer of claim 2, in which said laser, retardation plate, polarizer element, and detector form a generally elongated optical system, and said mirrors are disposed laterally of said system on one side thereof.

4. The diplexer of claim 1, in which said optical means include a mixing beam splitter.

5. The diplexer of claim 1, in which said retardation plate is mounted for rotational movement about said laser beam so as to allow adjustment of the relative intensity of said transmit beam and local oscillator beam components by rotating said retardation plate about an axis parallel to the direction of said laser beam.

6. The diplexer of claim 1, in which the relative intensity of said transmit beam and local oscillator beam is continuously adjustable during operation of said diplexer.

* * * * *